(12) United States Patent
Van Kleef et al.

(10) Patent No.: US 10,357,895 B2
(45) Date of Patent: Jul. 23, 2019

(54) BARREL HOOP DRIVING APPARATUS AND ELECTRIC DRIVE

(71) Applicant: Bohnert Equipment Company, Inc., Louisville, KY (US)

(72) Inventors: Ericus Andreas Van Kleef, Louisville, KY (US); James C. Alley, Windfall, IN (US); Robert Scott Feldmeier, Louisville, KY (US)

(73) Assignee: Bohnert Equipment Company, Inc., Louisville, KY (US)

( * ) Notice: Subject to any disclaimer, the term of this patent is extended or adjusted under 35 U.S.C. 154(b) by 597 days.

(21) Appl. No.: 15/131,791

(22) Filed: Apr. 18, 2016

(65) Prior Publication Data

US 2016/0303757 A1 Oct. 20, 2016

Related U.S. Application Data

(60) Provisional application No. 62/148,369, filed on Apr. 16, 2015.

(51) Int. Cl.
*B27H 5/10* (2006.01)

(52) U.S. Cl.
CPC ........... *B27H 5/10* (2013.01); *H02P 2205/05* (2013.01)

(58) Field of Classification Search
CPC .............. B27H 5/00; B27H 5/08; B27H 5/10
USPC .................................................. 147/49, 7, 8
See application file for complete search history.

(56) References Cited

U.S. PATENT DOCUMENTS

| 454,764 A | 6/1891 | Pleukharp | |
|---|---|---|---|
| 1,723,838 A | 8/1929 | Beugler | |
| 2,212,487 A | 8/1940 | Walstrom | |
| 4,279,282 A | 7/1981 | Whyte | |
| 6,384,561 B1 * | 5/2002 | Niizuma | G05B 9/03 318/563 |
| 7,248,014 B2 * | 7/2007 | Genma | G05B 19/19 318/560 |
| 8,890,460 B2 * | 11/2014 | Ikeda | G05B 6/02 318/369 |
| 2008/0168910 A1 | 7/2008 | Dexling et al. | |

(Continued)

FOREIGN PATENT DOCUMENTS

| DE | 46680 | 4/1889 |
|---|---|---|
| DE | 531461 | 8/1931 |
| DE | 548479 | 4/1932 |

(Continued)

OTHER PUBLICATIONS

European Patent Office, International Search Report and Written Opinion for PCT/US2016/028116 dated Jul. 14, 2016.

(Continued)

*Primary Examiner* — Matthew Katcoff
(74) *Attorney, Agent, or Firm* — Middleton Reutlinger

(57) ABSTRACT

Apparatus, systems, and processes control an electric motor to drive a hoop onto a wooden barrel, among other purposes. A controller may be connected to the electric motor and configured to receive user input data and generate one or more control signals for the electric motor that correspond to a torque generation of the electric motor and/or a rotation speed of the electric motor. A barrel hoop driver may comprise the controller and electric motor, where the electric motor drives a press member for driving hoops onto wooden barrels.

27 Claims, 10 Drawing Sheets

(56) References Cited

U.S. PATENT DOCUMENTS

2010/0045817 A1 2/2010 Saijo
2013/0187587 A1 7/2013 Knight et al.

FOREIGN PATENT DOCUMENTS

EP 1612037 A2 1/2006
FR 3002748 9/2014
SU 519329 6/1976

OTHER PUBLICATIONS

European Patent Office, Communication pursuant to Article 94(3) EPC for EP Application No. 16 719 672.4 dated Nov. 23, 2018.
European Patent Office, Communication pursuant to Rules 161(1) and 162 EPC for EP Application No. 16 719 672.4 dated Dec. 8, 2017.

\* cited by examiner

BARREL HOOP DRIVING APPARATUS AND ELECTRIC DRIVE

CROSS-REFERENCE TO RELATED APPLICATIONS

This application claims the filing benefit of U.S. Provisional Patent Application Ser. No. 62/148,369 filed on Apr. 16, 2015, which is incorporated by reference herein in its entirety.

FIELD OF THE INVENTION

Embodiments of the invention are generally related to apparatus, systems, and processes for electrical actuation, and in particular for an electrically-driven barrel hoop driving apparatus.

BACKGROUND

In some conventional manufacturing, a hydraulic system may be implemented for a press apparatus. For example, in the cooperage industry, a hydraulic press may be utilized to drive metal bands (referred to as "hoops") onto a wooden barrel, where such apparatus including the hydraulic press may be referred to as a barrel hoop driver. In general, a wooden barrel refers to a barrel or keg comprising a plurality of wooden staves held together by hoops. Furthermore, a wooden barrel may refer to any barrel at least partially comprising wood or wood based materials, such as wood composites. As will be appreciated, cooperages generally construct and finish wooden barrels for use in aging various alcoholic beverages, including wine, beer, whiskey, and/or other such alcoholic beverages. While conventional hoop drivers may be effective for the placement of hoops, various characteristics of the hydraulic presses used on such conventional hoop drivers are not desirable the finishing of wooden barrels. For example, heat and fluid (e.g., oil) associated with a hydraulic press may not be desirable in a cooperage setting. In particular, fluid from a hydraulic press may render a barrel unusable if fluid associated with the hydraulic press leaks onto the barrel.

SUMMARY

Some embodiments of the invention provide an electric drive system that comprises an electric motor connected to a controller, and suitable for use in applications conventionally utilizing hydraulic cylinders. The controller may be connected to a user interface device, such as a joystick, such that a user may interface with the electric motor via the user interface device. In such embodiments, the controller may generate one or more control signals based on user input data received from a user interface device. The one or more control signals may correspond to a torque to be generated (e.g., output) by the electric motor. The one or more control signals may also correspond to a rotation speed limit for the electric motor. Furthermore, the controller may be configured to actuate the electric motor responsive to user input at the user interface device for positional based movement, and the controller may be configured to monitor torque of the electric motor and adjust torque generated by the electric motor responsive to user input.

Some embodiments of the invention provide a system, apparatus, and process for driving hoops onto wooden barrels. In such embodiments, a hoop driving apparatus may be provided that comprises an electric drive system as described above connected to a mechanical linkage, e.g., incorporating one or more threaded rotatable members. The rotatable members may be connected to a press member that provides a press surface that may interact with a hoop to drive the hoop onto a wooden barrel. In general, the electric drive may rotate the one or more threaded rotatable members to thereby move the press member. When the press member engages a hoop for fitting on a wooden barrel, the electric drive may generate rotational torque to thereby rotate the one or more threaded rotatable members and drive the press member to thereby provide pressing force to drive the hoop onto the wooden barrel. As will be appreciated, the electrical drive system described herein may provide an interface similar to a hydraulic cylinder (e.g., a linear hydraulic motor) based system for an operator, where torque may be generated by the electric motor responsive to user input at a user interface device in a manner similar to a hydraulic cylinder based hoop driver.

Therefore, consistent with some aspects of the invention, a barrel hoop driver include a press member configured for linear movement along an axis to drive a hoop onto a barrel, a mechanical linkage configured to move the press member along the axis and cause the press member to apply a linear force to the hoop in response to a rotational input, and an electric motor coupled to the mechanical linkage to provide the rotational input thereto.

In some embodiments, the mechanical linkage includes a threaded rotatable member coupled to the press member configured for rotation in response to rotational torque generated by the electric motor, and in some embodiments, the threaded rotatable member is a first threaded rotatable member and the electric motor is a first electric motor, and the barrel hoop driver further includes a second threaded rotatable member coupled to the press member and a second electric motor that is synchronized with the first electric motor, where the second electric motor is coupled to the second rotatable member such that rotational torque generated by the second electric motor drives rotation of the second rotatable member.

In some embodiments, a barrel hoop driver may also include a controller connected to the electric motor and configured to communicate at least one control signal to the electric motor for actuating the electric motor to thereby generate rotational torque. In some embodiments, the at least one control signal corresponds to an amount of rotational torque for the electric motor to generate, and in some embodiments, the at least one control signal corresponds to a rotational speed limit for the electric motor. In some embodiments, the controller is configured to generate one or more control signals for the electric motor such that the electric motor is controlled like a linear hydraulic motor. Further, some embodiments include a frame that includes a rotatable support surface for the barrel, one or more positioning arms coupled to the press member and configured to drive a quarter hoop and/or an end hoop into a desired position on a first end of the barrel facing the press member, and at least one rotatable barrel clamp configured to engage the barrel to center the barrel on the support surface and further configured to rotate the barrel to face a second end of the barrel towards the press member.

Some embodiments also include at least one user interface device connected to the controller and configured to generate user input data. In some embodiments, the controller is configured to receive the user input data, process the user input data, and generate the at least one control signal based on the user input data, and in some embodiments, the controller is configured to smooth the user input data to generate processed input data by averaging position values of the user input data collected at a sampling interval over a buffer range. In some embodiments, the user interface device includes a variable input device, e.g., one or more buttons and/or one or more joysticks.

Further, in some embodiments, a joystick may be actuatable along a first axis and actuation thereof may correspond to an angle of actuation, where the user input data generated by the user interface device corresponds to the angle of actuation, and the controller is configured to generate a first control signal that corresponds to a rotational torque to be generated by the electric motor and a second control signal that corresponds to a rotational speed limit of the electric motor based at least in part on the angle of actuation of the joystick. In some embodiments, the rotational torque to be generated by the electric motor and the rotational speed limit of the electric motor increase as the angle of actuation of the joystick increases, and in some embodiments, the joystick is actuatable in first and second directions from an intermediate point along the first axis, the controller is configured to rotate the electric motor in a first direction of rotation and thereby move the press member in a first linear direction when the joystick is actuated in the first direction from the intermediate point and to rotate the electric motor in a second direction of rotation and thereby move the press member in a second linear direction when the joystick is actuated in the second direction from the intermediate point.

Consistent with other aspects of the invention, an apparatus may be provided that includes a servo motor, a mechanical linkage coupled to the servo motor and having a portion configured to travel along a linear axis responsive to rotation of the servo motor, and a controller in communication with the servo motor and configured to drive the servo motor using variable torque and speed limit inputs, with the variable torque input controlling torque generation by the servo motor and the variable speed limit input controlling a maximum rotational speed of the servo motor while being controlled by the variable torque input.

In some embodiments, the controller is configured to drive the servo motor to emulate a linear hydraulic motor, and in some embodiments, the controller is configured to drive the servo motor to provide speed-constrained torque generation by the servo motor. In addition, in some embodiments, the controller is configured to vary the variable torque and speed limit inputs in response to a variable input, and in some embodiments, the variable input comprises an automated program or a variable user control.

In some embodiments, the controller is configured to generate the speed limit input based at least in part on a fixed or variable ratio with the variable torque input, and in some embodiments, the controller is configured to adjust the speed limit input based upon an external input. Further, in some embodiments, the controller is configured to operate the servo motor in a torque mode and vary the speed limit input while the servo motor is operating in the torque mode based at least in part on the variable input. Some embodiments also include a press member coupled to the mechanical linkage for linear movement between first and second positions, where the controller is configured to drive the servo motor to move the press member between the first and second positions, and to apply a linear force to a workpiece interposed between the first and second positions. Further, in some embodiments, the controller is configured to substantially seamlessly transition between moving the press member and applying the linear force, and in some embodiments, the controller is further configured to monitor output torque of the servo motor and to selectively reduce the variable torque input when the output torque exceeds a continuous torque limit for the servo motor for a predetermined time associated with a peak torque limit for the servo motor to avoid generation of a torque fault by the servo motor.

Other embodiments may include various systems, press systems, controllers, program products, barrel hoop drivers, processes and/or methods corresponding to the various features mentioned above and/or otherwise disclosed elsewhere herein.

DESCRIPTION

Figure 1:
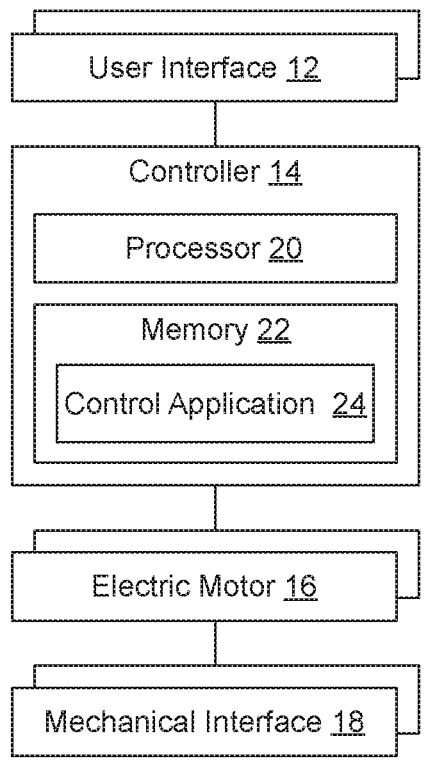
FIG. 1 provides a block diagram of components of an electric drive system.

Some embodiments of the invention provide a system, apparatus, and process for controlling an electric motor, e.g., a servo motor, to provide speed-constrained torque generation in linear thrust applications. Consistent with these embodiments of the invention, a controller connected to the electric motor is configured to actuate the electric motor in a manner similar to a mechanical actuator that includes a hydraulic cylinder. In such embodiments, the controller may control torque generated by the electric motor while limiting a rotation speed of the electric motor during monitoring of the generated torque to thereby perform in a manner generally similar to a hydraulic cylinder based actuator. Consistent with some embodiments, the controller may be connected to at least one user interface device (e.g., a joystick, a control panel, a touch screen display, etc.) to provide a variable input such than an operator may control actuation of the electric motor via the user interface device. The controller may be configured to actuate the electric motor responsive to user input received via the at least one user interface device such that a position of the electric motor may be adjusted, where such configuration may be referred to as position control. In addition, the controller may be configured to actuate the electric motor responsive to user input received via the at least one user interface device such that a torque generated by the electric motor may be adjusted, where such configuration may be referred to as torque control.

Furthermore, in some embodiments, the controller may be configured to dynamically switch from position control to torque control based at least in part on feedback from the electric motor, e.g., in some embodiments based upon detecting contact of a press member with a hoop on a barrel, detecting an increase in torque resulting from contact with a press member, detecting a lack of movement to a selected position, etc. As will be appreciated, such configuration of the controller may facilitate a dynamic switch from controlling a position of the electric motor via the at least one user interface device to controlling a generated torque of the electric motor via the at least one user interface device. The electric motor, configured controller, and at least one user interface device may be referred to as an electric drive system. Consistent with some embodiments of the invention, the electric drive system may be connected to a mechanical interface (which may also be referred to as linkage or mechanical linkage), such that control of the electric drive system by an operator with the at least one user interface device may cause mechanical actuation of one or more additional components. For example, the electric drive system may be connected to a mechanical interface comprising one or more rotatable members configured to translate rotational movement generated by the electric motor to linear movement of a moveable member—i.e., the electric drive system may be configured in a linear actuator for various applications. As will be appreciated, the mechanical interface may comprise one or more threaded rotatable members (e.g., a screw-based actuator mechanism), one or more wheel and axle mechanisms, one or more rigid-member based actuator mechanisms (such as a rigid-chain based actuator mechanism, a rigid-belt based actuator mechanism, a walking-beam based actuator mechanism), a cam-based actuator mechanism, a helical-band based actuator mechanism, a rack and pinion mechanism, a crank mechanism, a sprocket and chain mechanism, a belt and sheave mechanism, a belt and pulley mechanism and/or other such types of mechanisms configured to translate rotational movement of the electric motor to an application specific type of movement and/or force.

In some embodiments of the invention, a hoop driving apparatus may comprise an electric drive system connected to one or more threaded rotatable members. A press member may be connected to the one or more rotatable members, where the press member may move linearly when the one or more rotatable members are rotated by the electric motor of the electric drive system. A press surface of the press member may be configured to engage a hoop, and, through force applied by the press member to the hoop based on actuation of the electric motor, position/drive the hoop onto a wooden barrel. In such embodiments, a controller of the electric drive system may be connected to the electric motor of the electric drive system, where the controller may be configured to control the electric motor to generate torque based on operator input received via one or more user interface devices connected to the controller to thereby drive the hoop onto the barrel via the press member. Generally, a hoop driver described herein is configured to drive a hoop onto each end of a wooden barrel, where hoops nearest each end of a barrel may be referred to as "head" hoops or "chime" hoops. As will be appreciated, such head hoops generally differ from the hoops which correspond to a center of a wooden barrel (referred to as the bilge of the barrel), where the hoops proximate the center of the wooden barrel are referred to as "bilge" hoops. A hoop driver described herein may be further configured to drive bilge hoops into a desired position on a wooden barrel. Hoops located between a head hoop and a bilge hoop are generally referred to as "quarter" hoops. Embodiments of the invention may be configured to drive quarter hoops into a desired position on a wooden barrel.

Turning now to the figures, and particularly, to FIG. 1, this figure provides a block diagram that illustrates components of an electric drive system 10 consistent with some embodiments of the invention. As shown, the electric drive system comprises one or more user interface devices 12 connected to a controller 14. The controller 14 is connected to one or more electric motors 16, e.g., servo motors such as a G5 Accurax series servo motor available from Omron Corporation (although other servo motors may be used in other embodiments). As will be appreciated, for implementation in an apparatus (such as a hoop driver), each electric motor 16 may be connected to a mechanical interface 18 based on the specific implementation. While the mechanical interface 18 is illustrated for descriptive purposes, some embodiments of the invention including the electric drive system 10 may not include a mechanical interface 18, as the mechanical interface 18 is generally application specific. The controller comprises at least one hardware based data processor 20 and a memory 22 coupled to the processor 20. The memory includes a control application 24 stored thereon, where the control application 24 is configured to be executed by the data processor to cause the data processor to perform operations consistent with embodiments of the invention. Generally, the control application 24 may comprise program code, that when executed, may cause the controller 14 to process user input received from one or more connected user interface devices 12. Based on the received user input, the controller 14 may communicate one or more control signals to the electrical motor 16 to thereby control a position of the electrical motor 16 and/or control a torque generated by the electric motor 16. While embodiments described herein are described as comprising an electric motor 16, other embodiments are not so limited and may comprise one or more electric motors 16. For example, in some embodiments, the controller 14 may be connected to two electric motors 16, where a first electric motor 16 of the two electric motors 16 may be connected to the controller 14 and may receive control signals therefrom. A second electric motor 16 may be connected to the first electric motor 16 such that the first electric motor 16 is a master electric motor and the second electric motor 16 is a slave electric motor 16 that operates synchronously with the first electric motor.

As will be appreciated, some embodiments of the invention may comprise the control application 24 stored on a memory. Some embodiments of the invention may comprise the controller 14 that has been configured to perform operations during execution of the control application 24 that has been stored in the memory 22 of the controller 14. Some embodiments of the invention may comprise the electric drive system 10. Some embodiments of the invention may comprise the controller 14 connected to the electric motor 16. Some embodiments of the invention comprise a method/process for controlling the electric motor 16.

Figure 2:
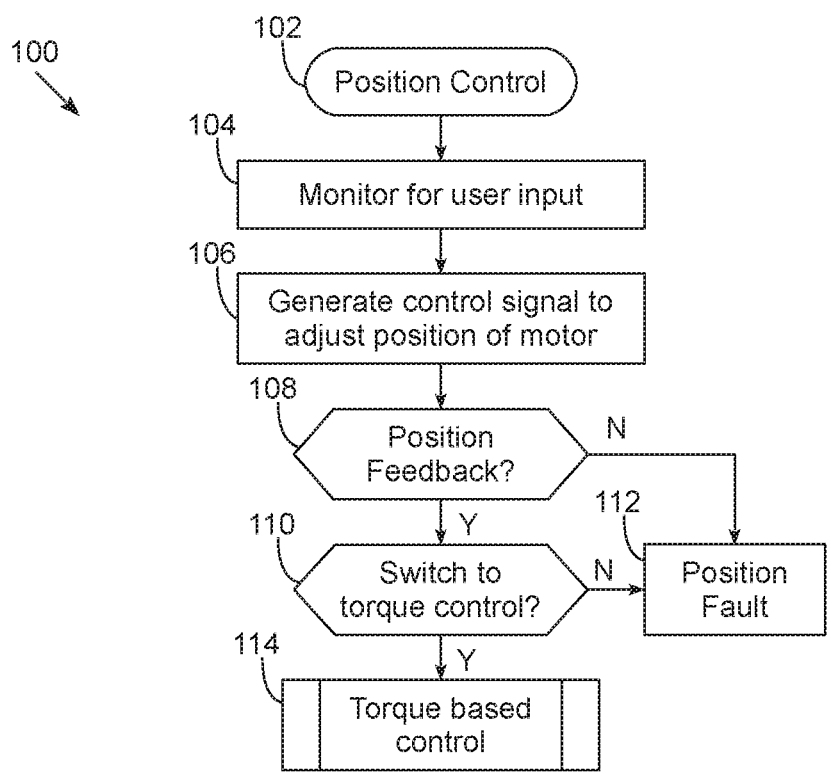
FIG. 2 provides a flowchart that illustrates a sequence of operations that may be performed by the controller of FIG. 1.

Turning now to FIG. 2, this figure provides a flowchart 100 that illustrates a sequence of operations that may be performed by the controller 14 consistent with some embodiments of the invention. As shown, the controller 14 may be in a position control setting 102, where the controller 14 may be configured to control a position of an electric motor 16 responsive to user input received from a user interface device 12. As will be appreciated, a position of the electric motor 16 may refer to an angle of rotation of the motor relative to a defined starting point (i.e., a defined 0° position). As will be further understood, if the electric motor 16 is connected to a mechanical interface 18 for implementation in an apparatus, the rotational position of the motor may correspond to linear position of a component linked to the electric motor 16 via the mechanical interface 18. Therefore, while position control of the electric motor 16 is referred to herein, in various applications of the invention, position control of the electric motor 16 may be described with respect to an axis along which a component linked to the electric motor 16 moves based on rotation of the electric motor 16.

As shown, the controller 14 monitors for user input from a connected user interface device (block 104), and the controller 14 processes the user input to generate one or more control signals based on the user input to thereby adjust a position of a connected electric motor (block 106). For example, if a connected user interface device is a joystick configured to move from a first position to a second position along a first axis, the controller 14 may generate one or more control signals to cause the electric motor 16 to move in a first direction (e.g., rotate clockwise) responsive to an operator actuating the joystick along the first axis towards the first position, and the controller 14 may generate one or more control signals to cause the electric motor 16 to move in a second direction (e.g., rotate counter-clockwise) responsive to an operator actuating the joystick along the first axis towards the second position.

During actuation of the electric motor 16 responsive to the user input data received at the controller 14, the controller monitors the electric motor 16 to determine whether the electric motor 16 encounters positioning feedback (block 108) during actuation. Generally, position feedback corresponds to when the electric motor 16 is not able to reach a position responsive to user input. As will be appreciated, position feedback generally occurs when the electric motor 16 encounters resistance to actuation to the expected position. Generally, position feedback may occur when actuation of the electric motor to the expected position (i.e., the position corresponding to the user input) may require generation of additional torque to generate a force sufficient to overcome an obstacle impeding actuation of the electric motor 16—i.e., position feedback occurs at a point where further actuation of the electric motor 16 requires work in excess of the quantity of work needed to actuate the electric motor 16. For example, if the electric drive system 10 is implemented in a barrel hoop driver apparatus, position feedback may occur when the press surface of the press member engages a hoop to be driven onto a wooden barrel. If position feedback does not occur ("N" branch of block 108), the controller 14 continues monitoring for user input data from the user interface device (block 104), and generating one or more control signals responsive to the user input data (block 106).

Consistent with some embodiments of the invention, the controller may detect position feedback (block 108) and dynamically switch to torque control. In these embodiments, if position feedback occurs ("Y" branch of block 108), the controller may determine whether to switch to torque control (block 110). If the controller is not configured to dynamically switch to torque control responsive to detecting position feedback from the electric motor 16 or if the controller 14 determines not to switch to torque control ("N" branch of block 110), the controller 14 may generate one or more control signals corresponding to a position fault (block 112). In general, the control signals corresponding to a position fault may cause the electric motor 16 to actuate to a previously achieved position. In response to determining to switch to torque control ("Y" branch of block 110), the controller 14 may switch to a torque based control as described herein (block 114).

Figure 3:
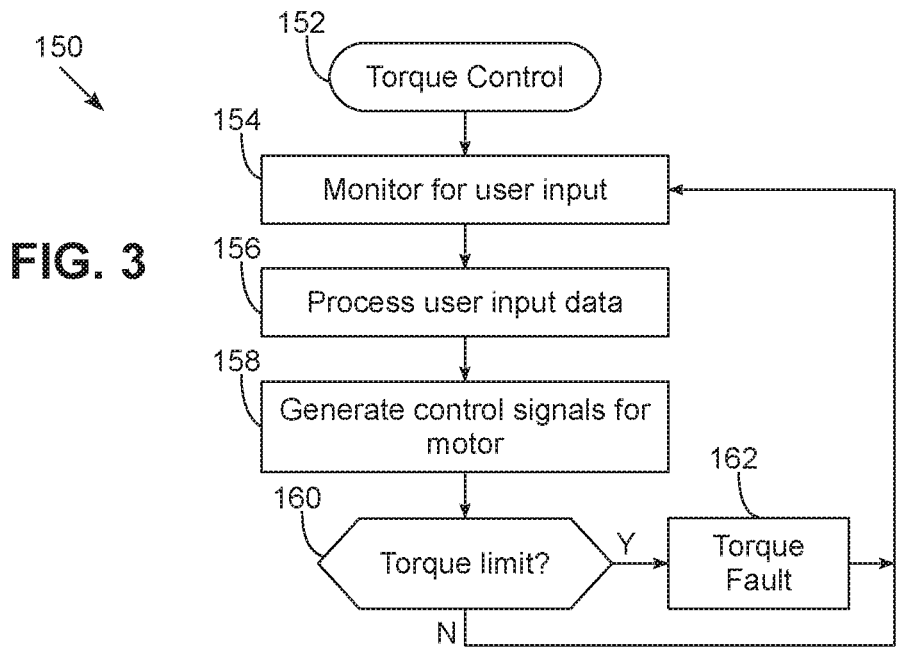
FIG. 3 provides a flowchart that illustrates a sequence of operations that may be performed by the controller of FIG. 1.

FIG. 3 provides a flowchart 150 that illustrates a sequence of operations that may be performed by the controller 14 consistent with some embodiments of the invention when the controller 14 is in a torque control 152 setting. As shown, the controller 14 monitors for user input data received from a connected user interface device 12 (block 154). As will be appreciated, in some embodiments, the user interface device 12 may comprise at least one joystick, and the user input data may correspond to an angle of actuation of the at least one joystick and/or a direction of actuation. The controller 14 processes received user input data (block 156) to generate processed input data, where processing of the received user input data may comprise determining a position value based on the received input data and/or smoothing the user input data to generate the processed input data.

In general, a position value may be a value that corresponds to a degree of actuation of a user interface device. For example, if the user interface device is a joystick, user input data may comprise a position value that corresponds to an angle of actuation of the joystick and/or a direction of actuation of the joystick. In this example, the controller 14 may smooth the position values of the user input data to reduce the effect of rapid actuation of the user interface device. For example, the controller 14 may receive a position value at defined sample intervals, and the controller 14 may average the position value of the defined sample intervals over a predefined buffer range. For example, the controller may be configured to monitor for user input with a sample interval ($\Delta t$) of 1 millisecond (i.e., $\Delta t=1$ ms). The controller 14 may be configured with a predefined buffer range (T) of 10 milliseconds (i.e., T=10 ms). In this example, the controller 14 may generate processed input data by averaging the position values collected during the 10 ms buffer range. The processed input data may comprise the average position value determined for the 10 ms range.

Based on the processed input data, the controller 14 generates one or more control signals that may be communicated to a connected electric motor 16 (block 158). In general, at least one control signal generated for the electric motor corresponds to a torque output of the electric motor. As will be appreciated, the torque output control signal generally corresponds to user input data. For example, if a user interface device is a joystick and the position value corresponds to an angle of actuation of the joystick, the torque output control signal generated by the controller is based on the angle of actuation of the joystick, where a higher angle of action of the joystick corresponds to a control signal associated with higher torque output of the electric motor and a lower angle of actuation of the joystick corresponds to a control signal associated with lower torque output of the electric motor. Generally, the torque output control signal corresponds to a root mean square (RMS) torque value and/or percentage relative to a rating of the electric motor.

Furthermore, at least one control signal of the one or more control signals comprises a control signal that is associated with a rotational speed limit for the electric motor, i.e., a maximum number of rotations per time period that the electric motor may reach. Generally, the control signal may indicate a maximum rotations per minute (RPM). As will be appreciated, the at least one control signal that is associated with a rotational speed limit for the electric motor generally corresponds to the user input data. For example, if the user interface device comprises a joystick and the user input data comprises a position value that corresponds to an angle of actuation of the joystick, a higher angle of actuation of the joystick corresponds to a higher rotational speed limit for the electric motor, and a lower angle of actuation of the joystick corresponds to a lower rotational speed limit for the electric motor. Generally, the control signal corresponding to a rotational speed limit may correspond to a maximum RPM and/or a percentage relative to a rating of the electric motor 16.

As discussed, the controller 14 generally collects user input data that indicates position values at a sampling interval. Therefore, as will be appreciated, as user input data is received and processed, the controller 14 continuously monitors for user input data, processes the user input data, and generates control signals for the electric motor based on the received and processed user input data. Furthermore, as discussed, the control signals generated generally comprise a torque generation/output command signal that indicates an amount of torque for the electric motor to generate and a maximum rotation speed that the electric motor may achieve. As discussed, the amount of torque to output and/or the maximum rotation speed may correspond to a percentage of a rating of the electric motor. For example, a control signal may correspond to a torque output of 150% RMS and an associated control signal may correspond to a rotation speed limit of 100% RPM.

As discussed above, a user interface device connected to the controller may comprise a joystick that may be configured to move along a first axis from a first position to a second position. During torque control of the electric motor, as an operator actuates the joystick, the controller may generate control signals that may cause the electric motor 16 to adjust rotational torque in a corresponding direction as well as adjust a maximum speed at which the electric motor may rotate. For example, if an operator moves the joystick in a first direction along the first axis, the controller 14 may generate control signals that cause the electric motor to increase rotational torque in a corresponding direction and increase a maximum rotational speed that the electric motor may reach.

During control of the electric motor 16, the controller 14 monitors torque output of the electric motor 16 to detect when the electric motor 16 reaches a torque limit (block 158). A torque limit may be a predefined value stored in the control application 24, where the predefined value may comprise a root mean square (RMS) torque value and/or percentage relative to a rating of the electric motor and/or a time limit. For example, a torque limit may define a RMS torque of 150% and a time limit of five seconds, where the controller may only control the electric motor 16 to generate a RMS torque of 150% for a period of five seconds before determining that the electric motor 16 has reached the torque limit. As will be appreciated, the torque limit may vary based on a type of the electric motor 16, and the torque limit generally protects against excessive wear and/or malfunction of the electric motor 16. In response to detecting that the electric motor 16 reached the torque limit ("Y" branch of block 160), the controller generates a control signal corresponding to a torque fault (block 162) that causes the electric motor 16 to stop rotation, thereby avoiding excessive wear and/or malfunction of the electric motor 16 due to an unsustainable workload. While the controller 14 does not detect the electric motor 16 reaching the torque limit ("N" branch of block 158), the controller continues monitoring for user input (block 154), processing the user input data to generate processed input data (block 156), and generating control signals responsive thereto (block 156).

Consistent with embodiments of the invention, the controller 14 may be configured to control a connected electric motor 16 such that the electric motor 16 operates in a manner similar to a linear hydraulic motor. Specifically, the controller 14 may transform user input received from a connected user interface device into control signals that actuate the electric motor 16 for torque generation. As will be appreciated, many electric motor systems generally include only position based control, which makes implementation of such electric motor systems for various applications inoperable and/or unreliable. As will be appreciated, a linear hydraulic motor operates such that control of a system including a linear hydraulic motor may be desirable for an operator based on the translation of user input data to output of the linear hydraulic motor. However, linear hydraulic motors generally have characteristics which render such actuators undesirable for many applications. Such undesirable characteristics of linear hydraulic motors generally include undesirable heat generation, undesirable vibration and noise generation, and undesirable potential hydraulic fluid leaks. Embodiments of the invention address the shortcomings of linear hydraulic motor based systems as well as many electric motor based systems. In particular, a controller 14 consistent with embodiments of the invention facilitates desirable control characteristics for an operator, where the controller 14 facilitates torque based control of an electric motor 16 via a connected user interface device 12. As will be appreciated, therefore, a controller 14 consistent with embodiments of the invention generally facilitates operation of an electric motor 16 based system such that a transition from positioning to working (i.e., generation of torque for work) may be seamless for an operator.

Figure 4A:
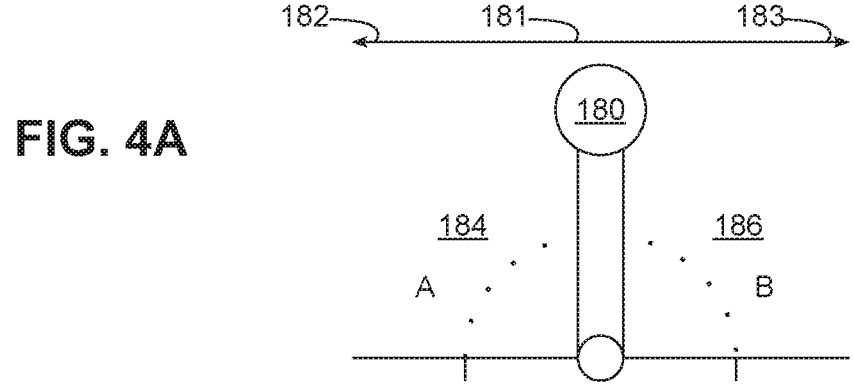
FIGS. 4A and 4B provide an example block diagram that may correspond to the electric drive system of FIG. 1.
Figure 4B:
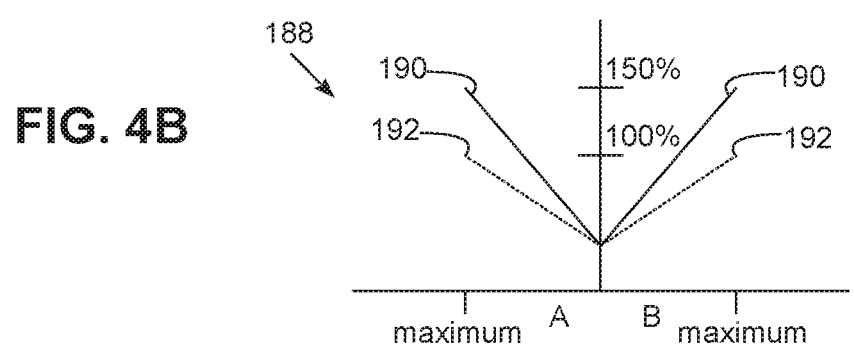

FIG. 4A provides an example block diagram for a joystick 180 that may be a user interface device consistent with some embodiments. As shown, the joystick 180 may be actuated (e.g., rotated) along a first axis 181 in a first direction 182 or a second direction 183 such that an angle of actuation A 184 or B 186 may be adjusted. FIG. 4B illustrates an example chart 188 that provides an example relationship between an angle of actuation of the joystick 180 and a torque output 190 and rotation speed limit 192 for an example electric motor. In general, a first angle of actuation A 184 corresponds to actuation of the joystick 180 in the first direction 182 and a second angle of actuation B 186 corresponds to actuation of the joystick 180 in the second direction, where the angle of actuation may be described in degrees relative to a neutral position (e.g., center position) of the joystick 180. As shown, as the angle of actuation A, B 184, 186 increases, the torque output 190 and rotation speed limit 192 generally increase. As further shown, a maximum angle of actuation for the joystick 180 may correspond to a 150% RMS torque output and a 100% RPM output. As will be appreciated, FIGS. 4A and 4B have been provided to illustrate the relationship of user input data to the control signal for torque output and the control signal for rotation speed limit, but the invention is not so limited. Other user interface devices, including for example, one or more buttons, a touchscreen device, a keyboard, one or more actuatable knobs, one or more actuatable levers, and/or other such known variable input devices may be implemented consistent with embodiments of the invention.

Figure 5:
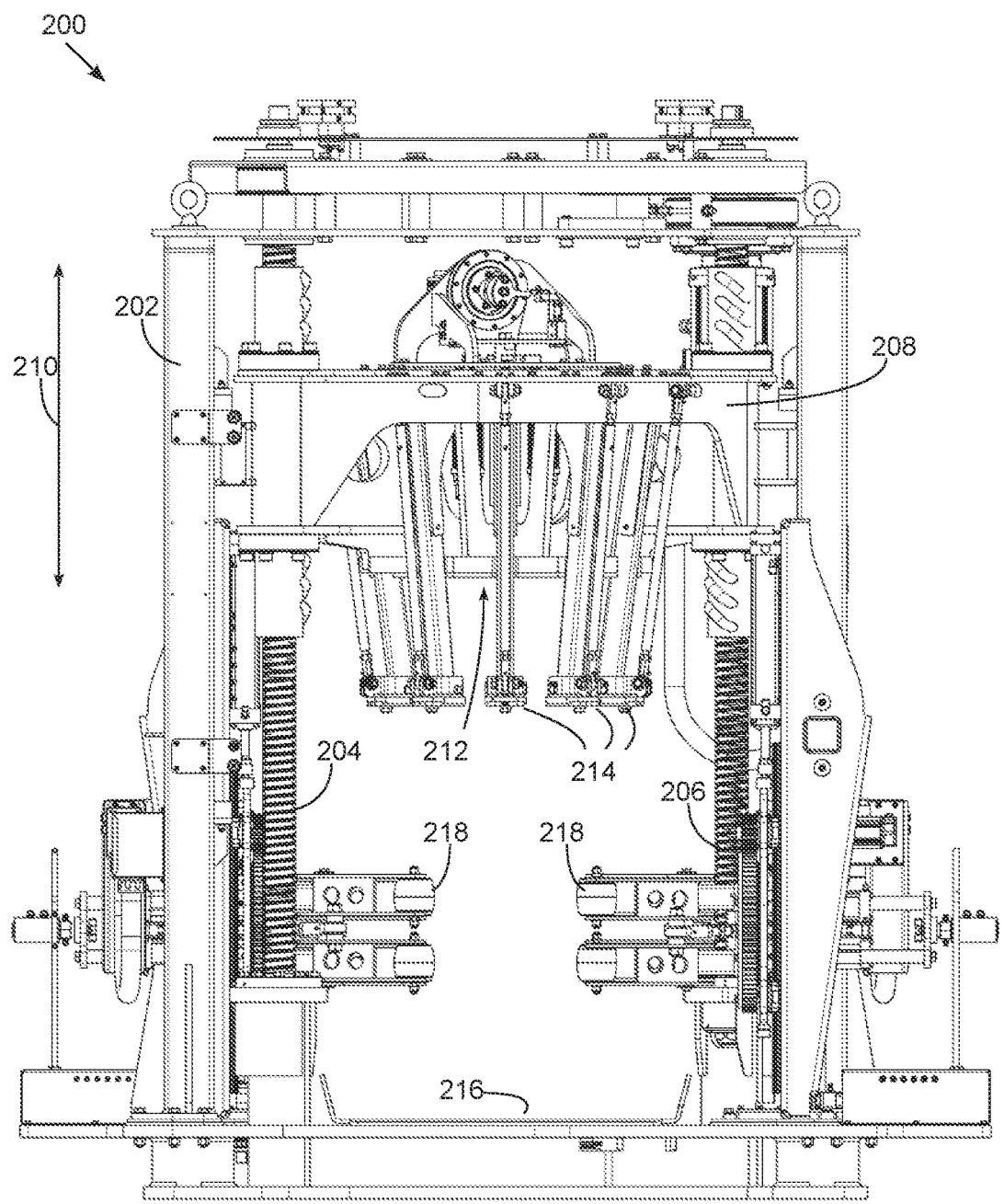
FIG. 5 provides a front view of a barrel hoop driver.
Figure 6:
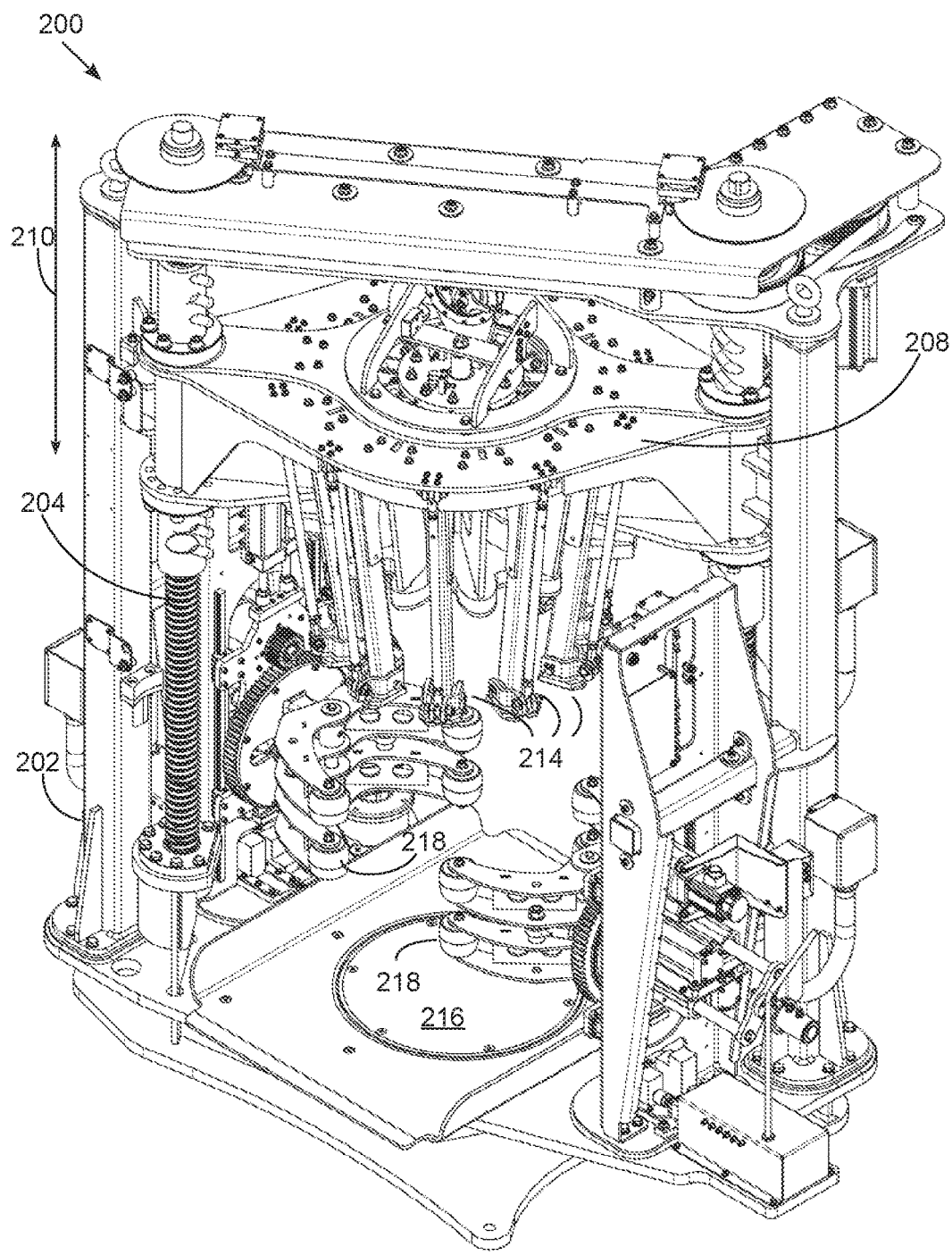
FIG. 6 provides an isometric view of the barrel hoop driver of FIG. 3.

Some embodiments of the invention comprise a barrel hoop driver that comprises one or more electric motors 16. The one or more electric motors 16 may be connected to a controller 14, and the controller 14 may be connected to one or more user interface devices 12 as illustrated in FIG. 1. FIG. 5 provides a front view of a barrel hoop driver 200 consistent with some embodiments of the invention. FIG. 6 provides a front isometric view of the barrel hoop driver 200. Referring to FIGS. 5 and 6, the hoop driver 200 comprises a support frame 202 that is coupled to a first rotatable member 204 and a second rotatable member 206 (collectively, the "rotatable members"). As shown, the rotatable members 204, 206 may be threaded, and a press member 208 may be coupled to the rotatable members 204, 206. While not shown, the rotatable members 204, 206 may be connected to at least one electric motor 16, such that rotation of the electric motor 16 may cause rotation of the rotatable members 204, 206. In turn, rotation of the rotatable members 204, 206 may be translated to linear movement of the press member 208 along a first axis 210, e.g., using threaded couplings on the press member that receive respective rotatable members 204, 206. Furthermore, while not shown, the rotatable members 204, 206 may be coupled to the one or more electric motors 16 and/or each other via one or more timing belts, timing chains, or other such mechanism for synchronizing rotation of electric motors 16, the first rotatable member 204, and/or the second rotatable member 206. Generally, the timing mechanism and rotatable members may correspond to the mechanical interface or linkage as described previously. In some embodiments, the barrel hoop driver 200 may comprise a first electric motor 16 connected to the first rotatable member 204 and a second electric motor 16 connected to the second rotatable member 206. The first electric motor 16 and the second electric motor 16 may be connected to each other such that rotation of the electric motors (and the rotatable members 204, 206) may be synchronized. For example, the first electric motor may serve as a master, and a control signal may be communicated to the second electric motor such that the second electric motor is synchronized with the first electric motor. As will be appreciated, the controller 14 may be connected to the first electric motor and/or the second electric motor.

As described previously, actuation of the electric motor may be controlled by an operator through use of a user interface device 12 connected to a controller 14. As will be appreciated, the user interface device 12 may comprise a joystick, where an axis of actuation of the joystick may correspond to the first axis 210 of movement of the press member. The press member 208 of the barrel hoop driver 200 comprises a press surface 212 that is configured to engage a hoop and drive the hoop onto a wooden barrel via a linear force exerted by the press member 208 on the hoop, where the linear force exerted by the press member corresponds to rotational torque generated by the electric motor 16. In addition, the barrel hoop driver 200 may include one or more positioning arms 214, where the positioning arms may be configured to position a wooden barrel for driving of a hoop thereon. In particular, the positioning arms 214 may be controlled by an operator with a user interface device 12 to increase and/or decrease a circumference of a circle formed by the positioning arms 214. As will be appreciated, an operator may center a wooden barrel for hoop driving by positioning the wooden barrel within the positioning arms 214 and decreasing the circumference of the circle formed thereby to thereby move the wooden barrel to a centered position of the circle formed by the positioning arms 214. For example, the user interface device may comprise a joystick, where a first axis of the joystick may control movement of the press member 208 along the first axis 210 and movement of the joystick along a second axis may control circumference of the positioning arms 214. In addition, the positioning arms 214 may be configured to engage a quarter hoop and/or a bilge hoop, such that the quarter hoop and/or bilge hoop may be driven to a desired position on a wooden barrel concurrent with driving of an end hoop onto the wooden barrel with the press surface of the press member.

The frame 202 of the barrel hoop driver 200 comprises a rotatable support surface 216 upon which a wooden barrel may rest during hoop driving. In addition, a wooden barrel resting thereon may be rotated on the rotatable support surface 216 when a hoop driving operation is not being performed. Furthermore, the barrel hoop driver 200 comprises adjustable barrel clamps 218. The adjustable barrel clamps are rotatably connected to the frame 202 and are configured to engage a wooden barrel positioned on the support surface 216. After driving of a hoop onto a first end of a wooden barrel, the adjustable barrel clamps may engage and support the barrel and rotate the barrel such that a hoop may be driven on a second end of the barrel. Hence, the clamps 218 may rotate about an axis generally perpendicular to the first axis 210.

In general, the hoop driver 200 may be configured to operate on various sizes of wooden barrels. Generally, sizes of wooden barrels are described in terms of volume measurements. Common cooperage wooden barrel sizes include, for example, 5 gallon, 8 gallon, 10 gallon, 15 gallon, 20 gallon, 23 gallon, 30 gallon, 53 gallon, 59 gallon, 60 gallon, and 65 gallon. As will be appreciated, the adjustable barrel clamps 218 are configured to engage and support various sizes of wooden barrels, where the clamps 218 may open wider to accommodate larger sizes and close to accommodate smaller sizes. Furthermore, a position of the clamps 218 may be adjustable along the first axis 210 based on a size of barrel for which the hoop driver 200 is being used to drive hoops. The clamps 218 may be positioned such that the clamps 218 engage a wooden barrel proximate the bilge of the barrel. As will be appreciated, the controller 14 may be configured with various profiles that correspond to different sizes of wooden barrels. Based on the size of the wooden barrel, the controller 14 may adjust a position of the clamps 218, actuation of the positioning arms 214, as well as maximum torque that the electric motor 16 may generate and/or the torque limit.

Figure 7:
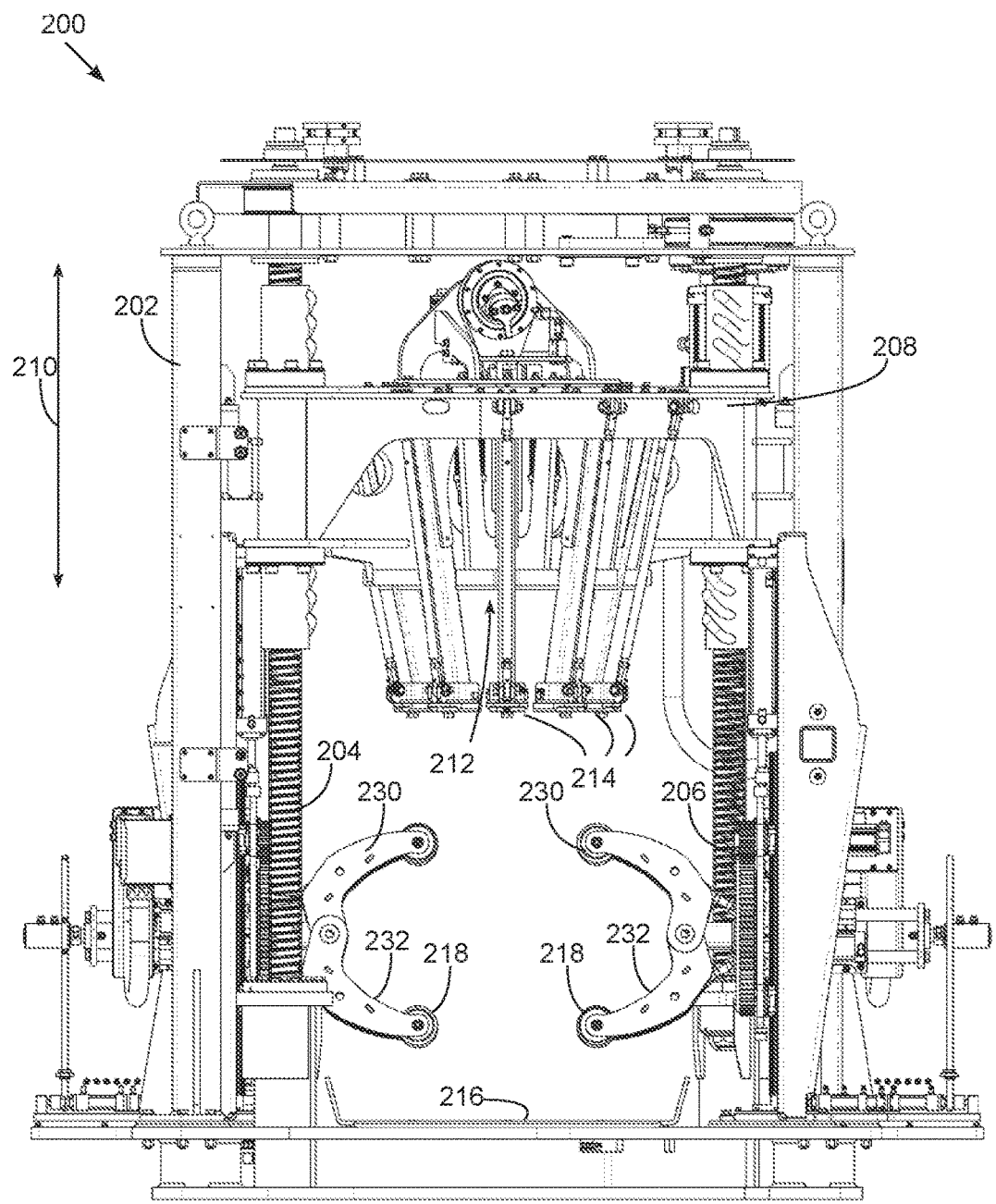
FIG. 7 provides a front view of the barrel hoop driver of FIG. 3.
Figure 8:
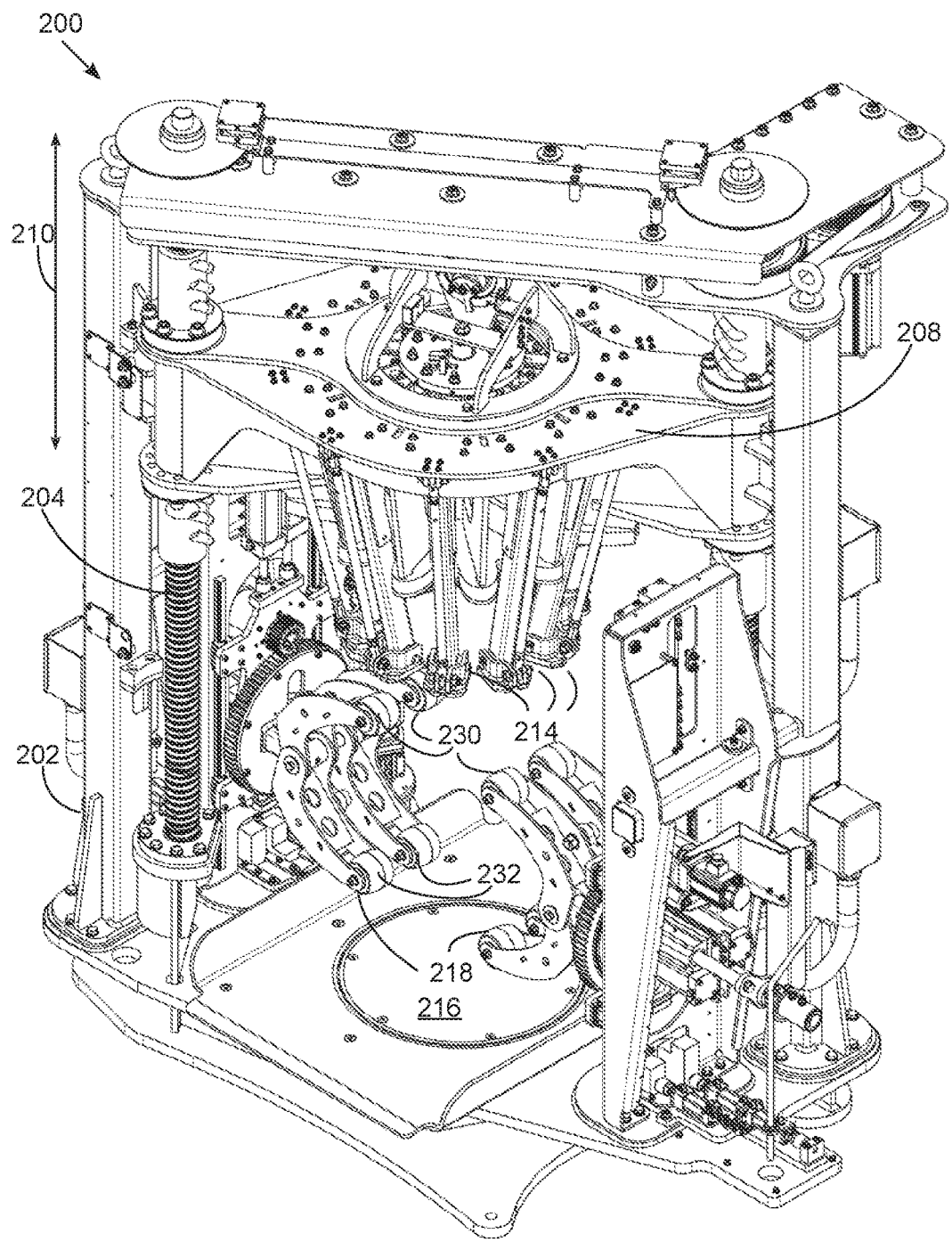
FIG. 8 provides an isometric view of the barrel hoop driver of FIG. 3.
Figure 9:
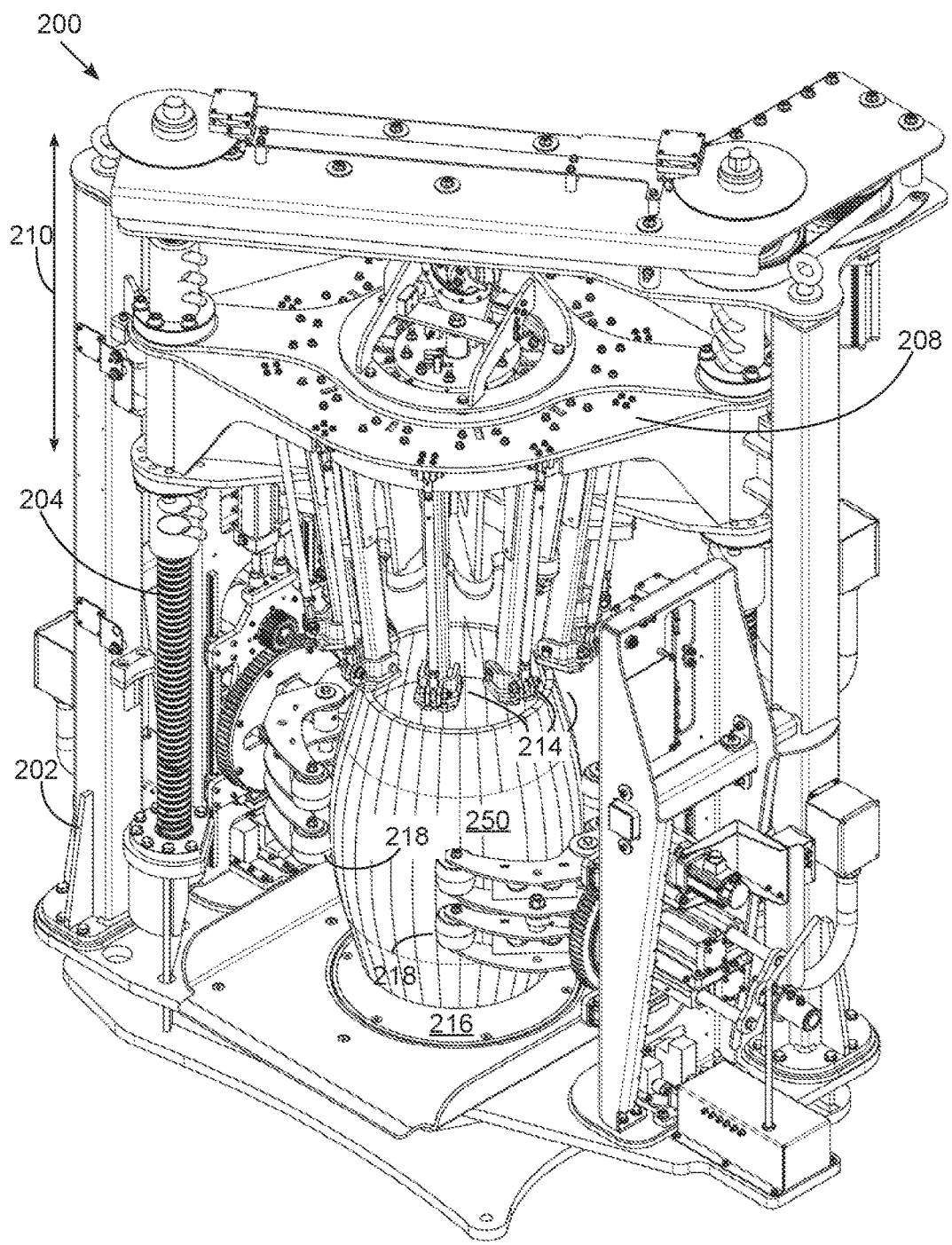
FIG. 9 provides an isometric view of the barrel hoop driver of FIG. 3 with an example wooden barrel.

FIG. 7 provides a front view of the barrel hoop driver 200 with the barrel clamps 218 rotated approximately 90° relative to the position of the barrel clamps 218 in FIGS. 5 and 6. FIG. 8 provides a front isometric view of the barrel hoop driver 200 with the barrel clamps 218 rotated approximately 90° relative to the position of the barrel clamps 218 in FIGS. 5 and 6. As shown in FIGS. 7 and 8, each barrel clamp 218 may comprise a first member 230 and a second member 232, where the first member 230 and second member 232 are rotatable about an axis and may be controlled by the controller 14 to open and close such that the barrel clamp 218 may engage and grip a wooden barrel positioned on the support surface 216. As discussed, the barrel clamps 218 may rotate about an axis to thereby rotate a wooden barrel gripped by the barrel clamps 218. As will be appreciated, the controller 14 may communicate control signals to the barrel clamps 218 to cause such rotation. Generally, a wooden barrel may be rotated such that a first end of the wooden barrel upon which a hoop has been driven may be rotated to the support surface 216 and a second end of the wooden barrel may be positioned for driving of a hoop thereon by the press surface 212. Hence, the barrel clamps 218 facilitate automated rotation of a wooden barrel such that hoops may be placed on each end of the wooden barrel. FIG. 9 provides a front isometric view of the barrel hoop driver 200 in which an example wooden barrel 250 has been positioned on the support surface 216.

Figure 10:
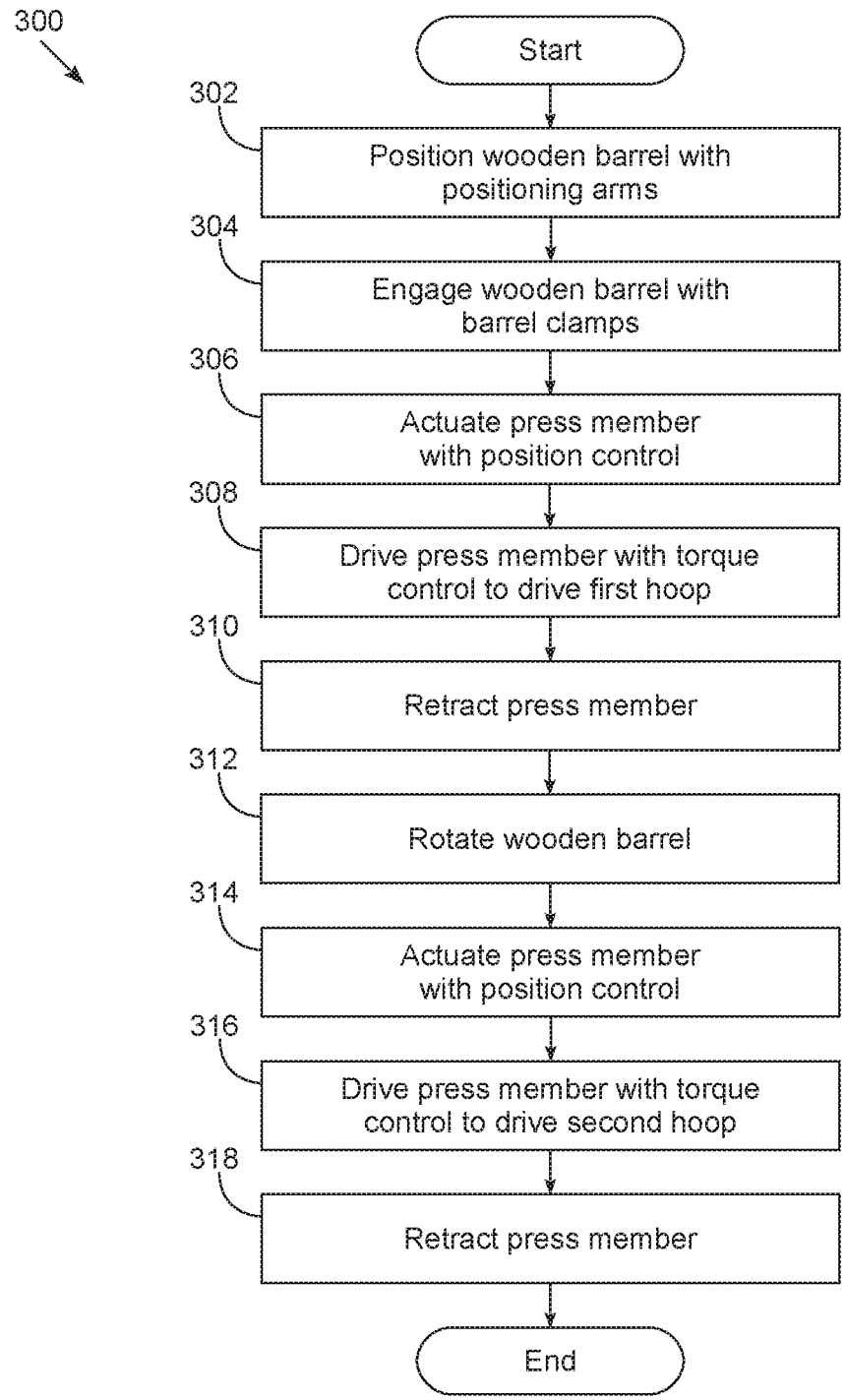
FIG. 10 provides a flowchart that illustrates a process that may be performed by the barrel hoop driver of FIG. 5-9.

FIG. 10 provides a flowchart 300 that illustrates a sequence of operations that may be performed by a barrel hoop driver 200 consistent with embodiments of the invention. As shown, after a wooden barrel has been loaded into the barrel hoop driver 200, the barrel hoop driver 200 may position the wooden barrel with the positioning arms 214 (block 302). The barrel hoop driver 200 may engage the wooden barrel with the barrel clamps 218 (block 304), and the barrel hoop driver may actuate the press member 208 by rotating the rotatable members 204, 206 with the electric motor 16 based on command signals received from the controller 14 (block 306) in a position control setting. In general, actuation of the press member 208 in position control may facilitate positioning the press member proximate the wooden barrel. The barrel hoop driver 200 may drive the press member 208 by rotation of the rotatable members 204, 206 with the electric motor 16 based on command signals received from the controller 14 (block 308) in a torque control setting to drive a first hoop on a first end of the wooden barrel. In general, driving a hoop on the wooden barrel will correspond to generation of torque by the electric motor as described herein based on user input data received at the controller 14. After the first hoop is placed on the wooden barrel, the press member is retracted (block 310), and the wooden barrel is rotated by rotation of the engaged barrel clamps 218 (block 312) such that a second end of a wooden barrel is positioned for driving of a hoop and the first end of the wooden barrel is placed on the support surface 216. As will be further appreciated, actuation of the barrel clamps 218 from an open position to an engaged position may be performed to position a wooden barrel in a centered position on the support surface 216.

The press member 208 is actuated by the electric motor 16 based on control signals received from the controller 14 in a position control setting (block 314) based on user input data received at the controller 14. The press member 208 is driven by rotation of the rotatable members 204, 206 by the electric motor 16 based on control signals received from the controller 14 in a torque control setting (block 316) to thereby drive a second hoop onto the second end of the wooden barrel. The press member may be retracted by rotation of the rotatable members 204, 206 by the electric motor 16 based on control signals received from the controller 14 (block 318).

It will be appreciated that in various embodiments, greater or fewer numbers of rotatable members 204, 206 may be used. It will also be appreciated that rotatable members 204, 206 and press member 208 may be considered in some embodiments to form leadscrew-type rotary-to-linear mechanical linkages or interfaces. In other embodiments, however, other types of rotary-to-linear mechanical linkages may be used.

Figure 11:
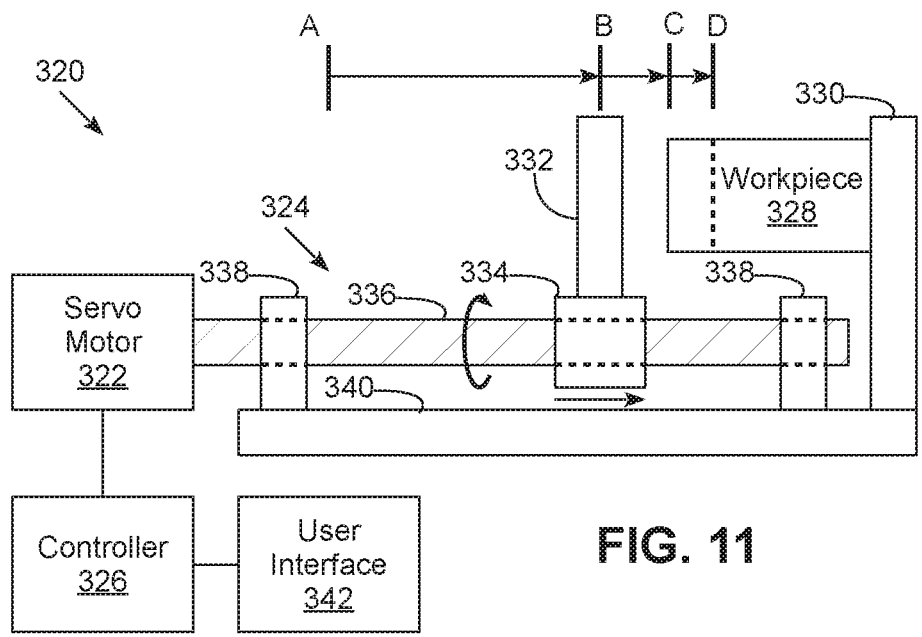
FIG. 11 provides a functional view of an electric press consistent with some aspects of the invention.

Now turning to FIG. 11, it will be appreciated that the various electric drive systems described above may be considered to provide linear thrust or force using an electric motor such as a servo motor controlled using proportional torque control with a variable speed or velocity clamp. To further illustrate this concept, FIG. 11 illustrates an electric press 320 including a servo motor 322, a rotary-to-linear mechanical linkage 324 and controller 326. Press 320 may be used, for example, to apply a linear force to a workpiece 328 positioned between a fixed support member 330 and a movable press member 332, and it will be appreciated that such a configuration may be used in innumerable different press-type applications, e.g., for barrel hoop driving, for pressing axles into rail car wheels, for splitting logs, or for any other applications where a linear force may be applied to one or more workpieces.

In this example, mechanical linkage 324 is implemented as a ball screw mechanism where press member 332 is mounted to a threaded ball member 334 that may be driven along a linear axis by a threaded rod 336 rotatably driven by servo motor 322. Threaded rod 336 may be supported by one or more bearing supports 338 mounted to a base 340.

In some implementations, a user interface 342 may also be provided to enable an operator to control press 320. In some implementations, the user interface may include a variable user control device such as a joystick, knob, etc. It will be appreciated, however, that in other implementations, no variable user control device may be used, e.g., where repeatable press operations are to be performed, such that proportional control signals as described herein may be generated by controller 326, rather than in response to a variable user control device.

In the illustrated embodiment, servo motor 322 may include an ability to be controlled in multiple modes, e.g., in position, torque and/or speed/velocity modes. In a position mode, for example, servo motor 322 may be responsive to a position signal to drive the servo motor to a selected rotational position. In a torque mode, servo motor 322 may be responsive to a torque signal to drive the servo motor to a selected torque (e.g., as a percentage of a rated continuous torque value supported by the servo motor). In a speed/velocity mode, servo motor 322 may be responsive to a speed signal to drive the servo motor at a selected speed or rotational velocity (e.g., RPMs). In some embodiments, controller 326 may switch servo motor 322 between different modes (e.g., dynamically, and without restarting the servo motor), while in other embodiments, controller 326 may operate servo motor 322 in a torque mode, but additionally incorporate a variable speed limit (also referred to as a velocity clamp) that may be based at least in part on a variable input from which a variable torque may be determined.

Put another way, in some embodiments of the invention, a variable input may be used to control both a torque input and a speed limit or velocity clamp input to a servo motor, and further, the torque input and the speed limit input may be effectively linked to one another to both vary in response to the variable input, thereby providing speed-constrained torque generation by the servo motor. The effective linking of torque and speed limit inputs may be implemented in a number of different manners consistent with the invention. In some embodiments, for example, a fixed ratio may be established between a torque input and a speed limit input such that an increase in the torque input and/or a variable input from which the torque input is calculated results in a proportional increase in the speed limit input. In other embodiments, a variable ratio may be used, e.g., a ratio that varies based upon an external input such as position, temperature, etc. For example, in one illustrative embodiment, a speed limit input may be automatically reduced proximate predetermined positions along the stroke of electric press 320, e.g., proximate the workpiece and/or proximate the ends of the stroke to prevent the press member from slamming into the workpiece and/or moving beyond an operational range for the press. Other manners of effectively linking torque and speed limit inputs such that each varies in a predetermined manner relative to a variable input will be appreciated by those of skill in the art having the benefit of the instant disclosure.

Figure 12:
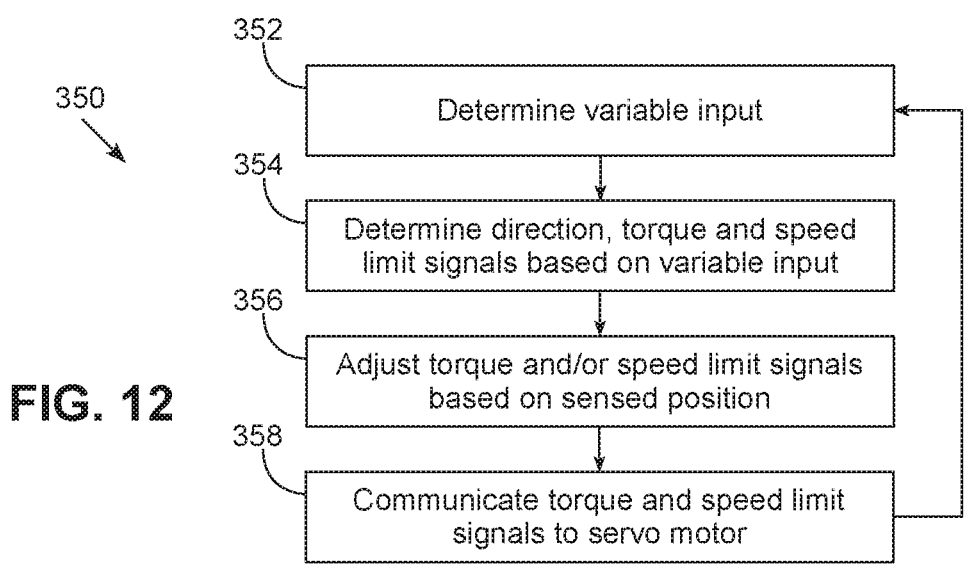
FIG. 12 provides a flowchart that illustrates a sequence of operations that may be performed by the controller of FIG. 11.

FIG. 12, for example, illustrates an example sequence of operations 350 that may be performed by controller 326 to drive servo motor 322 based on a variable input, e.g., as provided either by user interface 342 or by an automated program stored in the controller. Sequence of operations 350 defines a control loop including blocks 352-358 that drive servo motor 322 in response to a variable input. Block 352 determines the variable input, e.g., based upon a joystick input or a program input, and block 354 determines each of a direction, torque and a speed limit signal based upon that variable input. For example, in some embodiments, block 354 may determine a direction of rotation for the servo motor or a direction of travel for the press along with a torque signal, and then determine from the torque signal a corresponding speed limit signal as a fixed or variable ratio thereof. In other embodiments, the speed limit signal may be determined from the variable input, rather than from the torque signal generated therefrom. In addition, as illustrated in block 356, in some embodiments one or both of the torque signal and the speed limit signal may be further adjusted based upon an additional input, e.g., sensed position. As noted above, for example, it may be desirable to reduce the speed at predetermined positions along the stroke of the press. In addition, it may be desirable to enable higher or lower speeds depending upon the direction of travel.

Now turning to block 358, the direction, torque and speed limit signals are communicated to servo motor 322, with the controller therefor driving the servo motor accordingly. Control then returns to block 352.

Figure 13:
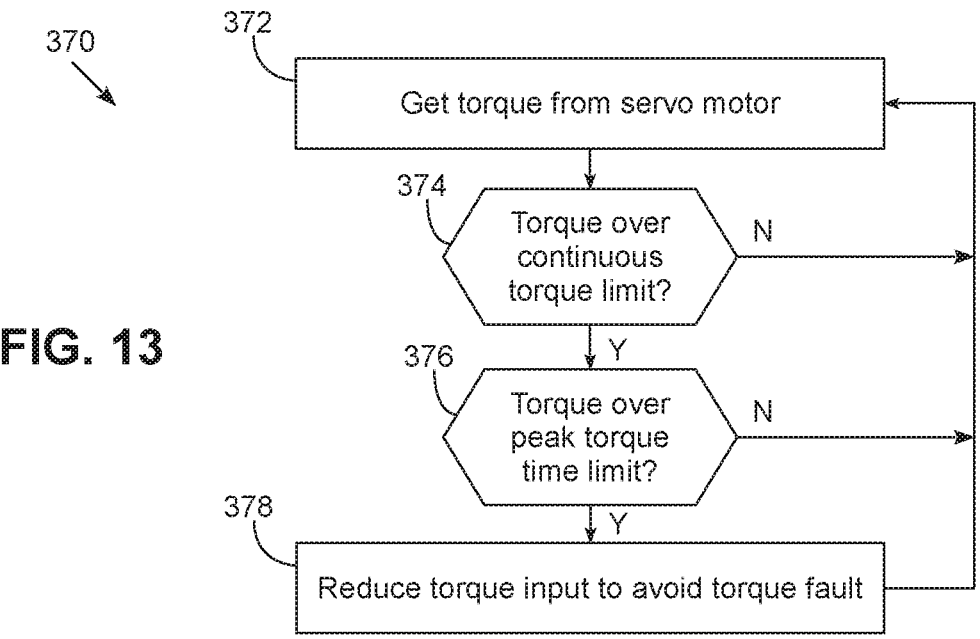
FIG. 13 provides a flowchart that illustrates a sequence of operations for limiting torque with the controller of FIG. 11.

Next turning to FIG. 13, it may be desirable in some embodiments to supplement torque control over the servo motor to minimize the occurrence of torque faults. Servo motors generally are rated with a continuous torque limit that is below a peak torque output of the motors, but are capable of being driven above the continuous torque limit for limited time periods (e.g., 150% for up to 5 seconds, 200% for up to 1 second, etc.). It may therefore be implement an additional control loop such as is illustrated by sequence of operations 370 of FIG. 13 to support driving a servo motor above its rated continuous torque limit but still within one or more peak torque limits established for the servo motor. In this control loop, block 372 obtains the current torque output from the servo motor, and block 374 determines whether the current torque output is over the continuous torque limit for the servo motor. If not, control returns to block 372. Otherwise, control passes to block 376 to determine whether the current torque output has been over a peak torque limit for the servo motor for over a time limit associated with the peak torque limit. If not, block 376 returns control to block 372. Otherwise, control passes to block 378 to reduce the torque input to the servo motor to bring the servo motor torque output below the peak torque limit and thereby avoid the generation of a torque fault by the servo motor, and then return control to block 372. It will be appreciated that multiple peak torque limits may be established for a servo motor, and further, that detection of time limits may be made in a number of manners, e.g., by setting a timer when the torque output exceeds the continuous torque limit for the servo motor and then reducing the torque input when the timer exceeds the time limit established for a peak torque limit of the servo motor.

It will be appreciated that in some embodiments, control over a servo motor coupled to a rotary-to-linear mechanical linkage in the manner described herein may be used to effectively emulate a hydraulic actuator motor such as a hydraulic cylinder, as the combination of a torque input and a speed limit input will, in the absence of a sufficient opposing force, will result in controlled linear travel of the mechanical linkage, while the same inputs will also, in the presence of a sufficient opposing force, result in application of a controlled linear force or thrust. Furthermore, the transition between travel and the application of linear force is in many instances effectively seamless from a control input perspective, just as is the case with a linear hydraulic motor.

Figure 14:
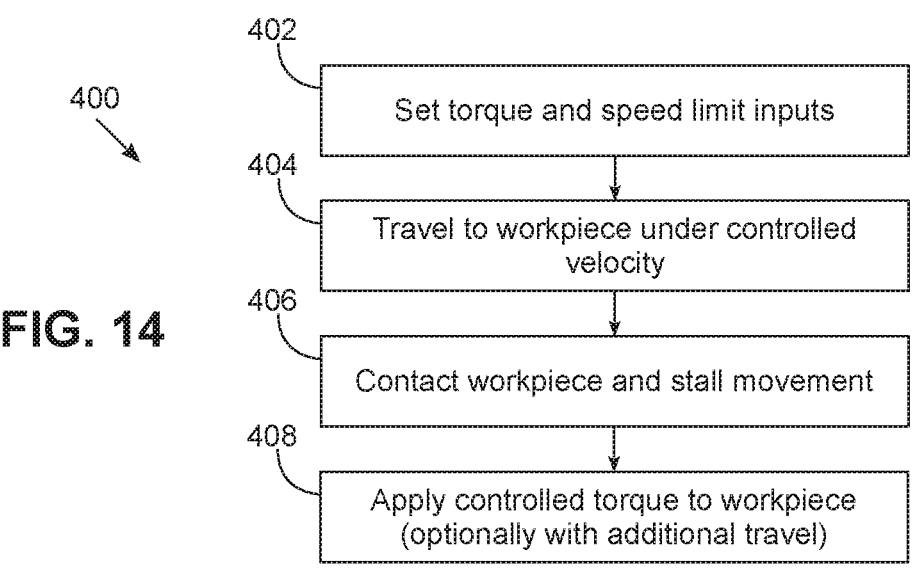
FIG. 14 provides a flowchart that illustrates a process for performing a press operation using the electric press of FIG. 11.

FIG. 14, for example, illustrates a sequence of operations 400 for a press operation performed with electric press 320 of FIG. 11. Assume, for example, that an operator manipulates a variable user control or an automated program selects a variable input with press member 332 initially at position A, such that in block 402, corresponding torque and speed limit inputs are communicated to servo motor 322, and in block 404, in the absence of contact between press member 332 and workpiece 328, press member 332 travels toward the workpiece (e.g., from position A to position B and then continuing on to position C) at a controlled velocity due to the speed limit input that limits the torque output by the servo motor below that specified by the torque input. Then, as illustrated in block 406, contact with the workpiece occurs at position C and movement of the press member is stalled, and as illustrated in block 408, a substantially seamless transition occurs to begin applying a controlled torque to the workpiece based principally on the torque input specified in block 402. Further, in the case that the workpiece is compressible, or if the work piece is multiple parts being press fit together (e.g., as is the case with driving a hoop on a barrel or driving an axle onto a rail car wheel), further travel of press member 332 may occur (e.g., to position D) in connection with the application of the controlled force.

Of note, the transition between travel and the application of linear force occurs based upon the same torque and speed limit inputs. Further, in some instances the variable input may be varied throughout a press operation, e.g., in response to user control via a joystick, such that, for example, an operator may direct the press member toward the workpiece through manipulation of the joystick in a first direction, and then upon contact with the workpiece, may continue to manipulate the joystick in the first direction to apply a desired linear force. Then, upon application of sufficient linear force, the operator may manipulate the joystick in an opposite direction to withdraw the press member from the workpiece. Further, in some embodiments, an operator may be permitted to select a button or other control upon completion of a press operation and have an automated program withdraw the press member and return to an initial starting position for a next press operation.

In general, the routines executed to implement the embodiments of the invention, whether implemented as a control application, part of an operating system, or a component, program, object, module or sequence of instructions, or even a subset thereof, may be referred to herein as "computer program code," or simply "program code." Program code typically comprises computer readable instructions that are resident at various times in various memory and storage devices in a data processing device (e.g., a computer and/or controller), and that, when read and executed by one or more processors in a data processing device, cause that data processing device to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, controller, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, controller, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A barrel hoop driver comprising:
   a press member configured for linear movement along an axis to drive a hoop onto a barrel;
   a mechanical linkage configured to move the press member along the axis and cause the press member to apply a linear force to the hoop in response to a rotational input; and
   an electric motor coupled to the mechanical linkage to provide the rotational input thereto;
   wherein the mechanical linkage includes a threaded rotatable member coupled to the press member and configured for rotation in response to rotational torque generated by the electric motor.

2. The barrel hoop driver of claim 1, wherein the threaded rotatable member is a first threaded rotatable member and the electric motor is a first electric motor, the barrel hoop driver further comprising:
   a second threaded rotatable member coupled to the press member; and
   a second electric motor that is synchronized with the first electric motor, wherein the second electric motor is coupled to the second rotatable member such that rotational torque generated by the second electric motor drives rotation of the second rotatable member.

3. The barrel hoop driver of claim 1, further comprising:
   a controller connected to the electric motor and configured to communicate at least one control signal to the electric motor for actuating the electric motor to thereby generate rotational torque.

4. The barrel hoop driver of claim 3, wherein the at least one control signal corresponds to an amount of rotational torque for the electric motor to generate.

5. The barrel hoop driver of claim 4, wherein the at least one control signal further corresponds to a rotational speed limit for the electric motor.

6. The barrel hoop driver of claim 3, wherein the controller is configured to generate one or more control signals for the electric motor such that the electric motor emulates a response of a linear hydraulic motor.

7. A barrel hoop driver, comprising:
a press member configured for linear movement along an axis to drive a hoop onto a barrel;
a mechanical linkage configured to move the press member along the axis and cause the press member to apply a linear force to the hoop in response to a rotational input;
an electric motor coupled to the mechanical linkage to provide the rotational input thereto;
a controller connected to the electric motor and configured to communicate at least one control signal to the electric motor for actuating the electric motor to thereby generate rotational torque;
a frame that includes a rotatable support surface for the barrel;
one or more positioning arms coupled to the press member and configured to drive the hoop into a desired position on a first end of the barrel facing the press member; and
at least one rotatable barrel clamp configured to engage the barrel to center the barrel on the support surface and further configured to rotate the barrel to face a second end of the barrel towards the press member.

8. A barrel hoop driver, comprising:
a press member configured for linear movement along an axis to drive a hoop onto a barrel;
a mechanical linkage configured to move the press member along the axis and cause the press member to apply a linear force to the hoop in response to a rotational input;
an electric motor coupled to the mechanical linkage to provide the rotational input thereto;
a controller connected to the electric motor and configured to communicate at least one control signal to the electric motor for actuating the electric motor to thereby generate rotational torque; and
at least one user interface device connected to the controller and configured to generate user input data.

9. The barrel hoop driver of claim 8, wherein the controller is configured to receive the user input data, process the user input data, and generate the at least one control signal based on the user input data.

10. The barrel hoop driver of claim 9, wherein the controller is configured to smooth the user input data to generate processed input data by averaging position values of the user input data collected at a sampling interval over a buffer range.

11. The barrel hoop driver of claim 8, wherein the user interface device comprises a variable input device.

12. The barrel hoop driver of claim 8, wherein the user interface device comprises at least one button.

13. The barrel hoop driver of claim 8, wherein the variable input device is a joystick.

14. The barrel hoop driver of claim 13, wherein the joystick is actuatable along a first axis and actuation thereof corresponds to an angle of actuation, wherein the user input data generated by the user interface device corresponds to the angle of actuation, and the controller is configured to generate a first control signal that corresponds to a rotational torque to be generated by the electric motor and a second control signal that corresponds to a rotational speed limit of the electric motor based at least in part on the angle of actuation of the joystick.

15. The barrel hoop driver of claim 14, wherein the rotational torque to be generated by the electric motor and the rotational speed limit of the electric motor increase as the angle of actuation of the joystick increases.

16. The barrel hoop driver of claim 14, wherein the joystick is actuatable in first and second directions from an intermediate point along the first axis, wherein the controller is configured to rotate the electric motor in a first direction of rotation and thereby move the press member in a first linear direction when the joystick is actuated in the first direction from the intermediate point and to rotate the electric motor in a second direction of rotation and thereby move the press member in a second linear direction when the joystick is actuated in the second direction from the intermediate point.

17. The barrel hoop driver of claim 6, wherein the controller is configured to generate the one or more control signals for the electric motor to emulate the response of a linear hydraulic motor by generating torque and speed limit signals that in an absence of a sufficient opposing force causes a controlled linear travel of the mechanical linkage and that in the presence of the sufficient opposing force causes an application of a controlled linear force.

18. The barrel hoop driver of claim 7, wherein the hoop is a quarter hoop.

19. The barrel hoop driver of claim 7, wherein the hoop is an end hoop.

20. The barrel hoop driver of claim 7, wherein the mechanical linkage includes a threaded rotatable member coupled to the press member and configured for rotation in response to rotational torque generated by the electric motor.

21. The barrel hoop driver of claim 8, wherein the mechanical linkage includes a threaded rotatable member coupled to the press member and configured for rotation in response to rotational torque generated by the electric motor.

22. The barrel hoop driver of claim 1, further comprising:
a controller connected to the electric motor and configured to communicate at least one control signal to the electric motor for actuating the electric motor to thereby generate rotational torque; and
at least one user interface device connected to the controller and configured to generate user input data, wherein the user interface device comprises a variable input device, wherein the variable input device is a joystick.

23. The barrel hoop driver of claim 22, wherein the joystick is actuatable along a first axis and actuation thereof corresponds to an angle of actuation, wherein the user input data generated by the user interface device corresponds to the angle of actuation, and the controller is configured to generate a first control signal that corresponds to a rotational torque to be generated by the electric motor and a second control signal that corresponds to a rotational speed limit of the electric motor based at least in part on the angle of actuation of the joystick.

24. The barrel hoop driver of claim 23, wherein the rotational torque to be generated by the electric motor and the rotational speed limit of the electric motor increase as the angle of actuation of the joystick increases.

25. The barrel hoop driver of claim 23, wherein the joystick is actuatable in first and second directions from an intermediate point along the first axis, wherein the controller is configured to rotate the electric motor in a first direction of rotation and thereby move the press member in a first linear direction when the joystick is actuated in the first direction from the intermediate point and to rotate the electric motor in a second direction of rotation and thereby move the press member in a second linear direction when the joystick is actuated in the second direction from the intermediate point.

26. The barrel hoop driver of claim 8, wherein the at least one control signal corresponds to an amount of rotational torque for the electric motor to generate.

27. The barrel hoop driver of claim 26, wherein the at least one control signal further corresponds to a rotational speed limit for the electric motor.

* * * * *